No. 612,106. Patented Oct. 11, 1898.
A. D. HILL.
PASTEURIZING APPARATUS.
(Application filed Aug. 20, 1897.)
(No Model.) 2 Sheets—Sheet 1.
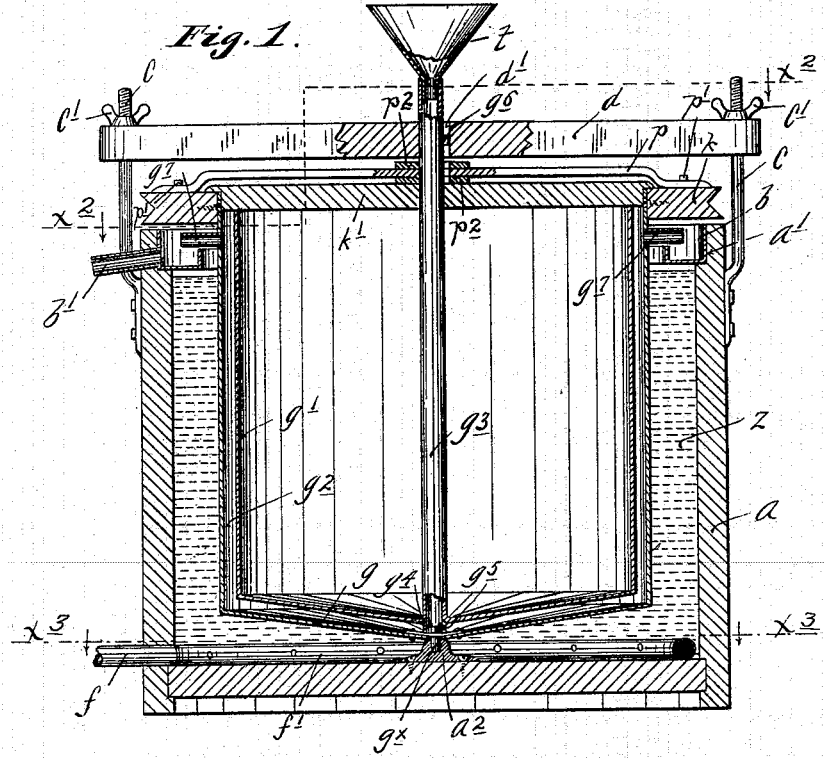
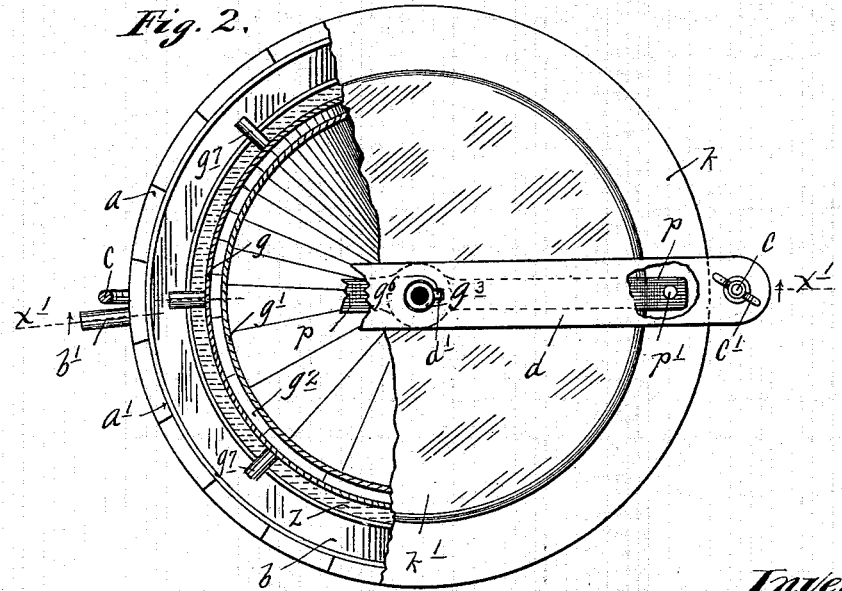
Witnesses.
Harry Kilgore,
R. D. Merchant,
Inventor:
Adelbert D. Hill.
By his Attorney.
Jas. F. Williams No. 612,106. Patented Oct. 11, 1898.
A. D. HILL.
PASTEURIZING APPARATUS.
(Application filed Aug. 20, 1897.)
(No Model.) 2 Sheets—Sheet 2.

Witnesses,
Harry Kilgore
A. D. Merchant

Inventor:
Adelbert D. Hill.
By his Attorney,
Jas. F. Williamson

UNITED STATES PATENT OFFICE.

ADELBERT D. HILL, OF STANTON, MINNESOTA.

PASTEURIZING APPARATUS.

SPECIFICATION forming part of Letters Patent No. 612,106, dated October 11, 1898.

Application filed August 20, 1897. Serial No. 648,872. (No model.)

*To all whom it may concern:*

Be it known that I, ADELBERT D. HILL, a citizen of the United States, residing at Stanton, in the county of Goodhue and State of Minnesota, have invented certain new and useful Improvements in Pasteurizing Apparatus; and I do hereby declare the following to be a full, clear, and exact description of the invention, such as will enable others skilled in the art to which it appertains to make and use the same.

My present invention has for its object to provide an improved pasteurizing apparatus especially adapted for use in the treatment of cream and milk, but also adapted for a much more general use.

To this end my invention consists of the novel devices and combinations of devices hereinafter described and defined in the claims.

The preferred form of my present invention is illustrated in the accompanying drawings, wherein like characters indicate like parts throughout the several views.

Figure 3:
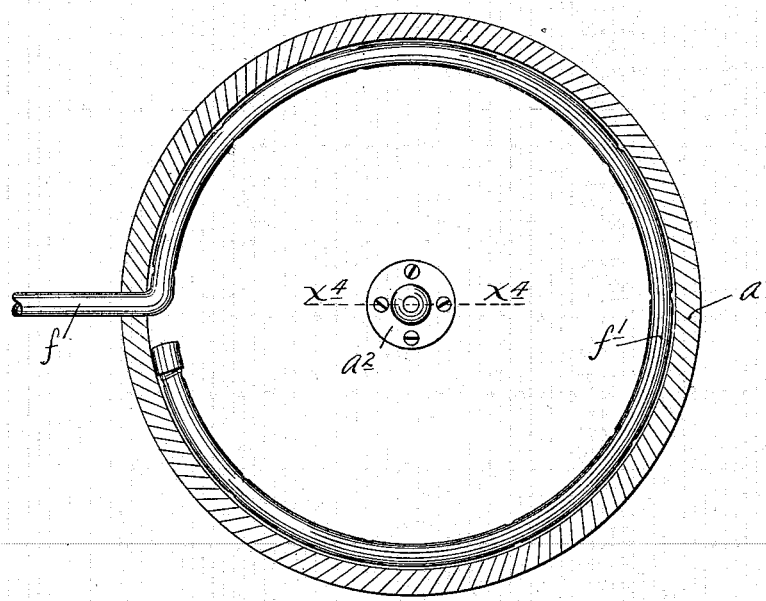
Figure 4:
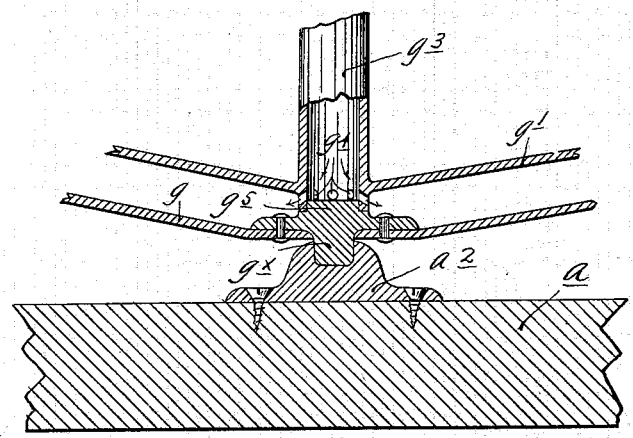

Figure 1 is a view, partly in side elevation, but principally in central vertical section, on the line $x'\ x'$ of Fig. 2. Fig. 2 is a view, principally in plan, but partly in horizontal section, taken on the line $x^2\ x^2$ of Fig. 1. Fig. 3 is a horizontal section taken on the line $x^3\ x^3$ of Fig. 1, and Fig. 4 is a vertical section taken on the line $x^4\ x^4$ of Fig. 3.

$a$ indicates a vat or tank with open upper end and is preferably constructed of wood. As shown, the upper end of the tank or vat $a$ is provided with an internal enlargement or ledge $a'$. An annular trough $b$ is seated in said enlargement $a'$, with the outer portion of its bottom resting on the ledge formed thereby. For a purpose which will later appear the inner flange or wall of the trough $b$ is cut considerably lower than the outer flange or wall of the same. A draw-off or drip pipe $b'$ extends outward from the lower portion of the annular trough $b$ through the wall of said tank or vat $a$. A pair of yoke or draw bolts $c$ are secured in working positions with their lower ends rigidly attached to the exterior of the vat $a$ at points diametrically oppposite to each other. The upper ends of the bolts $c$ are screw-threaded and are provided with removable thumb-nuts $c'$. A removable yoke bar or beam $d$ is adapted to be secured in a horizontal position, extending diametrically across and slightly above the open upper end of the vat $a$ by means of the yoke-bolts $c$, which are passed through suitable perforations in the ends of said yoke or bar $d$, with the thumb-nuts $c'$ engaging the upper face of the same.

A steam-supply pipe $f$, which terminates in a perforated coil $f'$, located in the bottom of the vat $a$ and following closely to the inner surface of the same, serves to convey steam from a suitable source of supply and to discharge the same into said vat for heating purposes. To the upper surface of the vat-bottom, at the axial center of the vat, is rigidly secured a bearing block or plate $a^2$.

A cylindrical vessel $g$, which in diameter is slightly less than the passage through the annular trough $b$, is mounted with freedom for rotary movement on its vertical axis within the tank or vat $a$. To accomplish this mounting, the bottom of the vessel $g$ is provided with a depending trunnion $g^\times$, which is journaled in the bearing block or casting $a^2$. A similar vessel $g'$ is positioned within the said vessel $g$, with its side walls and bottoms spaced inward from the walls and bottom of said vessel $g$, so as to form a thin annular heating-chamber $g^2$ with shallow bottom. The inner vessel $g'$ is provided with an axially-located feed-pipe $g^3$, which is fixed to the bottom thereof at its lower end, projects a slight distance through said bottom, and is provided just below said bottom with radial discharge-passages $g^4$. The trunnion-casting $g^\times$, which is secured to the bottom of the vessel $g$, is provided with a vertically-extended trunnion $g^5$, which is slightly reduced at its upper end, so as to work freely within the lower end of the feed-pipe $g^3$.

The upper portion of the feed-pipe $g^3$ is provided with a laterally-projecting pin $g^6$, which engages a vertical keyway $d'$ in the transverse yoke-bar $d$. In this manner the inner vessel $g'$ is securely held against rotary movement, while the outer vessel $g$ is free to rotate on its vertical axis or, in other words, on the feed-pipe $g^3$ as an axis.

Just above the inner flange of the annular trough $b$ the rotary vessel $g$ is provided with a series of radial discharge-passages formed by short pipe-sections $g^7$, the outer ends of which project over into said trough $b$. Rigidly secured to the upper end of the rotary vessel $g$ is an annular sheave or pulley $k$, which overlies and runs close to the upper open portion of the vat $a$ and trough $b$. By means of a suitable belt (not shown, but which runs over said sheave or pulley $k$) rotary motion is imparted to the said rotary vessel $g$. As shown, the open upper end of said vessel $g$ is closed by a removable cover $k'$.

The upper end of the rotary vessel $g$ is held to a true rotary movement by means of a cross-bar $p$, which extends diametrically across said vessel, above said cover $k'$, with its central portion journaled on the axial feed-pipe $g^3$ and its ends removably secured to the driving-sheave $k$ by means of dowel-pins $p'$. As shown, a pair of washers $p^2$ are placed on the feed-pipe $g^3$, one above and the other below said cross-bar $p$. $t$ indicates a funnel, shown as placed in the upper and receiving end of the axial feed-pipe $g^3$.

The operation of the apparatus above described in detail is substantially as follows: By turning on the steam through the pipe $f$ and nozzle $f'$ the temperature of the water $z$, contained in the tank or vat $a$, may be raised to the desired degree to give the proper pasteurizing action on the liquid which is to be pasteurized within the heating-chamber $g^2$. The milk, cream, or other liquid to be pasteurized is introduced into the funnel $t$, preferably in a continuous stream, and will run through the supply-pipe $g^3$ into the bottom of the heating-chamber $g^2$. Under the action of convection the hottest particles of the milk or cream will be kept at the top of the annular heating-chamber or on the line of the discharge-passages or pipe-sections $g^7$, and when the heating-chamber is sufficiently filled will be discharged in small streams through said pipe-sections and into the annular trough $b$. While this action is going on, the inner vessel $g'$ is held stationary and the outer vessel $g$ is kept under a continuous rotary motion by means already described.

As the vessel $g'$ is fixed and the vessel $g$ is rotary, the cream or milk which is being pasteurized within the heating-chamber $g^2$ is by the frictional contact with the said vessels continually stirred or mixed, so that different particles thereof are all the time being brought into engagement with the heating-surfaces of said vessels. This action is very important, as it renders the pasteurizing action more thorough and at the same time more rapid.

What I claim, and desire to secure by Letters Patent of the United States, is as follows:

1. In a pasteurizing or like apparatus, the combination of a tank or vat $a$, the interiorly-arranged concentric vessels $g$, $g'$, suitably spaced apart to form a narrow annular heating-chamber for the reception of the liquid to be treated, the vessel $g'$ being fixed in position and the vessel $g$ being adapted to rotate, the axial feed-pipe $g^3$ secured to the vessel $g'$ and delivering into the bottom of the chamber $g^2$, and means for rotating the vessel $g$; substantially as described.

2. In a pasteurizing or like apparatus, the combination of the tank or vat $a$, having the annular catch-trough $a'$, the draw-bolts and nuts $c$, $c'$, the yoke-bar $d$ held by said draw-bolts, the interiorly-arranged concentric vessels $g$, $g'$, suitably spaced apart to form a narrow annular heating-chamber for the reception of the liquid to be treated, the vessel $g'$ being fixed in position and the vessel $g$ being adapted to rotate, the axial feed-pipe $g^3$ secured to the vessel $g'$ and provided with openings delivering into the bottom of the heating-chamber $g^2$, and passing through the yoke-bar $d$ and secured thereto against rotation, the sheave $k$ secured to the vessel $g$, and the cross-bar $p$ attached to the sheave at its ends, and having the feed-pipe $g^3$ extending through it; substantially as described.

3. In a pasteurizing or like apparatus, the combination of a tank or vat, concentric vessels arranged interiorly of the tank and suitably spaced apart to form a narrow annular heating-chamber for the liquid to be treated, a feed-pipe delivering into the bottom of the liquid-heating chamber, and discharge-pipes leading from the upper part of said chamber, the inner one of said vessels being secured in fixed position, and the outer one being adapted to rotate and provided with means for rotating it; substantially as described.

In testimony whereof I affix my signature in presence of two witnesses.

ADELBERT D. HILL.

Witnesses:
P. S. ASLAKSON,
A. P. WOODWARD.